(12) United States Patent
Ohashi

(10) Patent No.: US 6,525,885 B2
(45) Date of Patent: Feb. 25, 2003

(54) ZOOM LENS, CAMERA AND PORTABLE INFORMATION TERMINAL DEVICE

(75) Inventor: Kazuyasu Ohashi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/851,388

(22) Filed: May 9, 2001

(65) Prior Publication Data

US 2002/0024745 A1 Feb. 28, 2002

(30) Foreign Application Priority Data

May 17, 2000 (JP) ........................................ 2000-145515

(51) Int. Cl.⁷ ........................... G02B 15/14; G02B 1/10; G02B 9/00
(52) U.S. Cl. ........................ 359/690; 359/581; 359/738
(58) Field of Search ........................... 359/687, 690, 359/738, 581, 586, 588; 427/166, 525

(56) References Cited

U.S. PATENT DOCUMENTS 3,809,459 A * 5/1974 Wakamiya et al. ......... 359/581

FOREIGN PATENT DOCUMENTS

| JP | 7-128501 | 5/1995 |
| JP | 2901144 | 3/1999 |
| JP | 2991554 | 10/1999 |

* cited by examiner

Primary Examiner—Georgia Epps
Assistant Examiner—David N. Spector
(74) Attorney, Agent, or Firm—Oblon, Spivak, McClelland, Maier & Neustadt, P.C.

(57) ABSTRACT

A zoom lens comprises a first lens group having a positive focal length, a second lens group having a negative focal length, an aperture stop member, a third lens group having a positive focal length, disposed in the stated order from an object. The first lens group includes a 1-1 negative meniscus lens having a convex surface facing the object, a positive 1-2 lens having a surface having a large curvature facing the object and joined to the 1-1 lens, and a positive meniscus 1-3 lens having a convex surface facing the object, disposed in the stated order from the object. A reflection preventing part is formed on a surface at which the 1-1 lens and the 1-2 lens are joined.

11 Claims, 8 Drawing Sheets

ZOOM LENS, CAMERA AND PORTABLE INFORMATION TERMINAL DEVICE

BACKGROUND OF THE INVENTION

1. Field of the Invention

The present invention generally relates to a zoom lens, a camera such as a digital camera, a video camera, a silver-bromide camera or the like, using a zoom lens and a potable information terminal device using the zoom lens.

2. Description of the Related Art

In the related art, a zoom lens has a first lens group having a positive focal length, a second lens group having a negative focal length and an aperture stop member, disposed in this order from the side of an object, and a third lens group disposed on the side of an image from said aperture stop member and having a positive focal length. Such a type of zoom lens is disclosed by Japanese Patent No. 2901144, and so forth.

Further, Japanese Patent No. 2991554 discloses a wide wavelength-range ghost preventing optical system achieving prevention of ghost by using a coating film. Further, Japanese Laid-Open Patent Application No. 07-128501 discloses an imaging optical system reducing ghost flare. In this imaging optical system, reflected light outside of an effective diameter of the lens is reduced.

Such a type of zoom lens as that mentioned above is suitable for miniaturization and achievement of high-power magnification/reduction, and, is used in a video camera and a digital (still) camera, for example. In such a type of zoom lens, for the necessity of aberration correction, the above-mentioned first lens group has a 1-1 negative meniscus lens having a convex surface directed toward an object, a positive 1-2 lens having a surface having a large curvature directed toward the object and joined to the 1-1 lens, and a positive meniscus 1-3 lens having a convex surface directed toward the object, disposed in this order from the object, in many cases.

Further, with regard to such an image-pickup and imaging optical system, this system has a problem of ghost flare. Especially, such a type of ghost flare as that in which reflected light reflected between two lenses reaches an image surface even through the light source does not exist within the screen may occur depending on the configuration of lenses.

SUMMARY OF THE INVENTION

An object of the present invention is to solve the above-mentioned problems. Specifically, an object of the present invention is to provide a such a type of zoom lens as that mentioned above in which the above-mentioned type of ghost flare as that generated as a result of reflected light reflected between two lenses reaching an image surface can be reduced.

A zoom lens according to the present invention includes a first lens group having a positive focal length, a second lens group having a negative focal length, an aperture stop member, a third lens group having a positive focal length, disposed in the stated order from the side of an object. The above-mentioned first lens group includes a negative meniscus 1-1 lens having a convex surface directed toward the object, a positive meniscus 1-2 lens having a convex surface having a large curvature directed toward the object and joined with the 1-1 lens, and a positive meniscus 1-3 lens having a convex surface directed toward the object, disposed in the stated order from the side of the object. Further, a reflection preventing measure is formed on a surface at which the 1-1 lens and said 1-2 lens are joined.

Thereby, it is possible to reduce such a type of ghost flare as that generated as a result of reflected light reflected between two lens surfaces of the zoom lens reaching an image surface. Accordingly, even in a case of taking a picture against the (sun) light through a video camera or a digital camera employing the zoom lens, it is possible to take a high-quality picture.

The reflection preventing measure may comprise a coating film formed only on one of a second surface of the 1-1 lens and a first surface of the 1-2 lens having a higher refractive index of lens material.

Thereby, it is possible to effectively reduce the ghost light through a simple configuration at low costs.

The reflection preventing measure may comprise coating films formed both on the second surface of the 1-1 lens and on the first surface of the 1-2 lens, respectively.

Thereby, it is possible to provide the zoom lens in which the ghost flare is effectively reduced even in a design such that aberration correction is performed with high priority. Accordingly, it is possible to achieve a miniaturized, value added, such as wide-range size-variable, video camera or digital camera rendering high image quality even in a case of taking a picture against the (sun) light.

The reflection preventing measure may comprise an adhesive layer having a high refractive index $n_a$ used for joining the 1-1 lens and the 1-2 lens together, wherein:

$$n_a > 1.60$$

Thereby, it is possible to provide the zoom lens in which the ghost light is effectively reduced without increasing the number of steps of manufacturing process of the zoom lens. Accordingly, it is possible to provide a miniaturized, value added, such as wide-range size-variable, digital camera or video camera at low costs.

The following formula may be satisfied:

$$(|n_{1-1} - n_a| + |n_{1-2} - n_a|)/2 < 0.21$$

where $n_{1-1}$ denotes a refractive index of the 1-1 lens and $n_{1-2}$ denotes a refractive index of the 1-2 lens.

Thereby, it is possible to provide the zoom lens in which the ghost flare is reduced more effectively. Accordingly, it is possible to provide a digital camera or a video camera in which an image quality of a picture taken against the (sun) light is further improved.

A multi-coating film may be formed on the first surface of the 1-1 lens.

Thereby, it is possible to provide the zoom lens in which the ghost flare can be reduced more effectively. Accordingly, it is possible to provide a video camera or a digital camera which can be used against the (sun) light with a higher performance.

A camera according to the present invention employs one of the above-mentioned zoom lens according to the present invention as an image pickup lens thereof. This camera may comprise a normal silver-bromide camera, or a camera having a function of generating digital information from a picked-up image, such as a digital still camera, a digital video camera, and so forth. Accordingly, such a camera may comprise a portable information terminal device which can transmit such digital information externally through the Internet or the like.

Other objects and further features of the present invention will become more apparent from the following detailed description when read in conjunction with the accompanying drawings.

DETAILED DESCRIPTION OF THE PREFERRED EMBODIMENTS

In an imaging lens such as a camera lens, generally, a reflection preventing coating film is formed on a lens surface for improving a transmittance and preventing ghost flare. MgF2 single-layer film coating is used most generally for this purpose. However, in this film, a relatively large amount of residual reflected light exists, and the spectrum characteristic thereof is not flat (the further the wavelength is different from the basic wavelength the larger the reflectance becomes). Therefore, such a type of film may not be sufficient to be used as a counter measure against the ghost flare. Accordingly, in a case where further prevention of reflection is needed, a multi-layer coating film (multi-coating film) made of a plurality of types of vapor deposited substances may be used.

With regard to a surface at which two lenses are joined, as the reflectance of adhesive used there is sufficiently higher than the reflectance of air, this surface has a reflectance as low as, or lower than that in a case of single-layer coating, originally, in many cases. Accordingly, a measure of preventing reflection is rarely provided on such a surface at which two lenses are joined.

However, in a zoom lens having a first lens group having a positive focal length, a second lens group having a negative focal length and an aperture stop member, disposed in this order from the side of an object, and a third lens group disposed on the side of an image from the aperture stop member and having a positive focal length, wherein the above-mentioned first lens group has a 1-1 negative meniscus lens having a convex surface directed toward the object, a positive 1-2 lens having a surface having a large curvature directed toward the object and joined to the 1-1 lens, and a positive meniscus 1-3 lens having a convex surface directed toward the object, disposed in this order from the object, forming a reflection preventing measure on the surface at which the above-mentioned 1-1 lens and 1-2 lens are joined is effective for reduction of the ghost flare.

Figure 1:
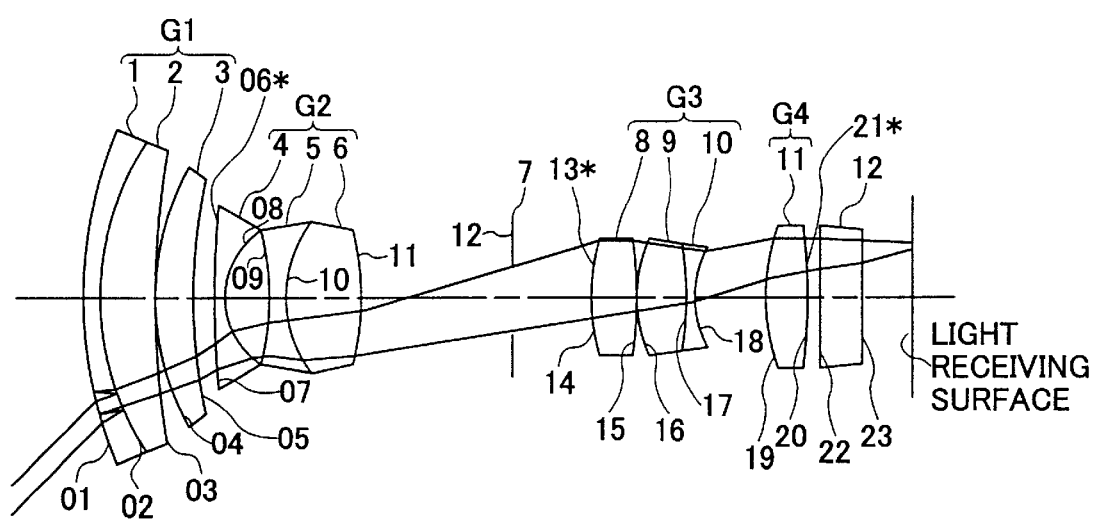
FIG. 1 shows a configuration of a first embodiment of the present invention.

FIG. 1 shows a zoom lens in a first embodiment of the present invention.

This zoom lens includes a first lens group G1 having a positive focal length, a second lens group G2 having a negative focal length, an aperture stop member 7, a third lens group G3 having a positive focal length, a fourth lens group G4 and a filter 12, disposed in the stated order from an object.

The first lens group G1 includes a negative meniscus 1-1 lens 1 having a convex surface directed toward the object, a positive meniscus 1-2 lens 2 having a convex surface having a larger curvature directed toward the object and joined with the 1-1 lens, and a positive meniscus 1-3 lens 3 having a convex surface directed toward the object, disposed in the stated order from the object.

The second lens group G2 includes a negative meniscus 2-1 lens 4 having a surface having a large curvature directed toward an image, a double-concave 2-2 lens 5 and a double-convex 2-3 lens 6, disposed in the stated order from the object.

The third lens group G3 includes a double-convex 3-1 lens 8, a positive meniscus 3-2 lens 9 having a surface having a large curvature directed toward the object, and a negative meniscus 3-3 lens 10 having a surface having a larger curvature directed toward the image, disposed in the stated order from the object.

The fourth lens group G4 includes a double-convex 4-1 lens 11.

The surface at which the 1-1 lens and 1-2 lens are joined together is provided with a reflection preventing measure which will be described later.

Figure 2:
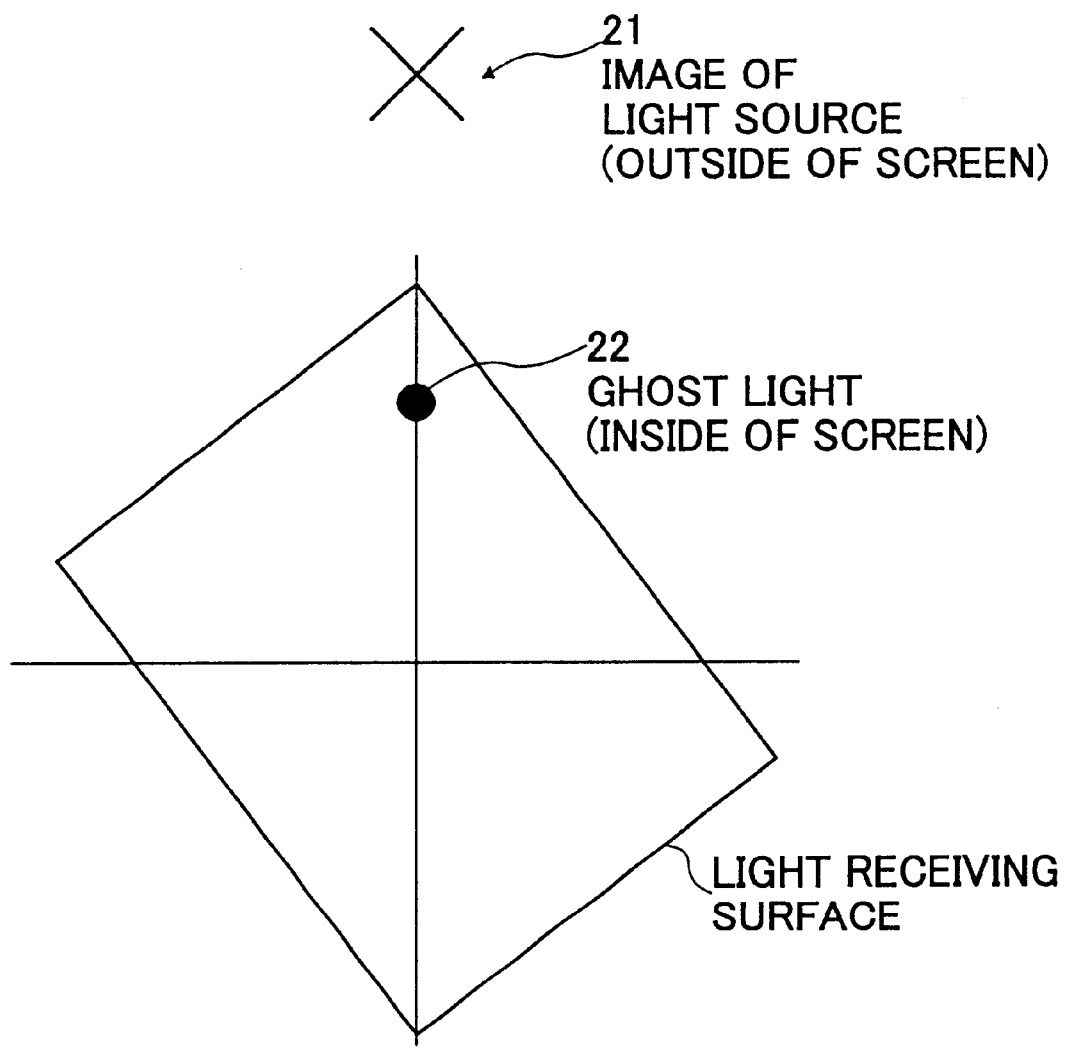
FIG. 2 shows a spot diagram of an image formed on an image surface in a system shown in FIG. 1.

As shown in FIG. 1, in a state of a short-focal-length end of the zoom lens in the first embodiment, a beam coming from a light source (approximately infinite, such as the sun) with an angle of 45° with respect to the optical axis is reflected between the first two lens surfaces (01 and 02) and reaches an image surface (light receiving surface), and thus, the ghost light is generated. The ghost light is reflected by the surface (02) at which the 1-1 lens 1 and 1-2 lens 2 are joined together, and, then, is reflected by the first surface (01) of the 1-1 lens again. FIG. 2 shows a spot diagram of the ghost light on the image surface (light receiving surface). The rectangle frame shown in FIG. 2 shows an image-pickup screen (light receiving surface) in a case where the light source is in a diagonal direction, for example.

A half field angle of the zoom lens in the embodiment in the state of the short-focal-length end thereof is 32.8°, and an image of the light source 21 having the angle 45° with respect to the optical axis exists outside of the screen, as shown in FIG. 2. However, the ghost light 22 enters the screen, and is focused there. Accordingly, it is bright and remarkable. In this zoom lens having the configuration as described above, it is difficult to exclude this type of ghost light from the screen even when configuration parameters of the lenses are altered in various manners.

Further, in this zoom lens, the reflectance of the surface (02) at which the 1-1 lens 1 and 1-2 lens 2 are joined is likely to be high. This is because it is necessary to use a glass material having a high refractive index and a high dispersion for the 1-1 lens 1 for the purpose of correcting various aberrations, and, as a result, a difference in refractive index between the 1-1 lens and the adhesive used for the junction of these two lenses is considerably large. Further, with regard to the 1-2 lens 2, it is preferable to use a glass material having a high refractive index (low dispersion) for the purpose of correcting curvature field. When such a material is used for the 1-2 lens 2, the reflectance of the surface (02) at which the lenses 1 and 2 are joined becomes further high. Accordingly, the above-mentioned ghost light is likely to be further remarkable.

The reflectance R (transmittance T) at a boundary between two media is estimated by the following formulas (1) and (2):

$$T = (4 \cdot n_1 \cdot n_2)/(n_1 + n_2)^2 \quad (1)$$

$$R = 1 - T \quad (2)$$

where $n_1$, $n_2$ denote the refractive indexes of the media, respectively.

Figure 5:
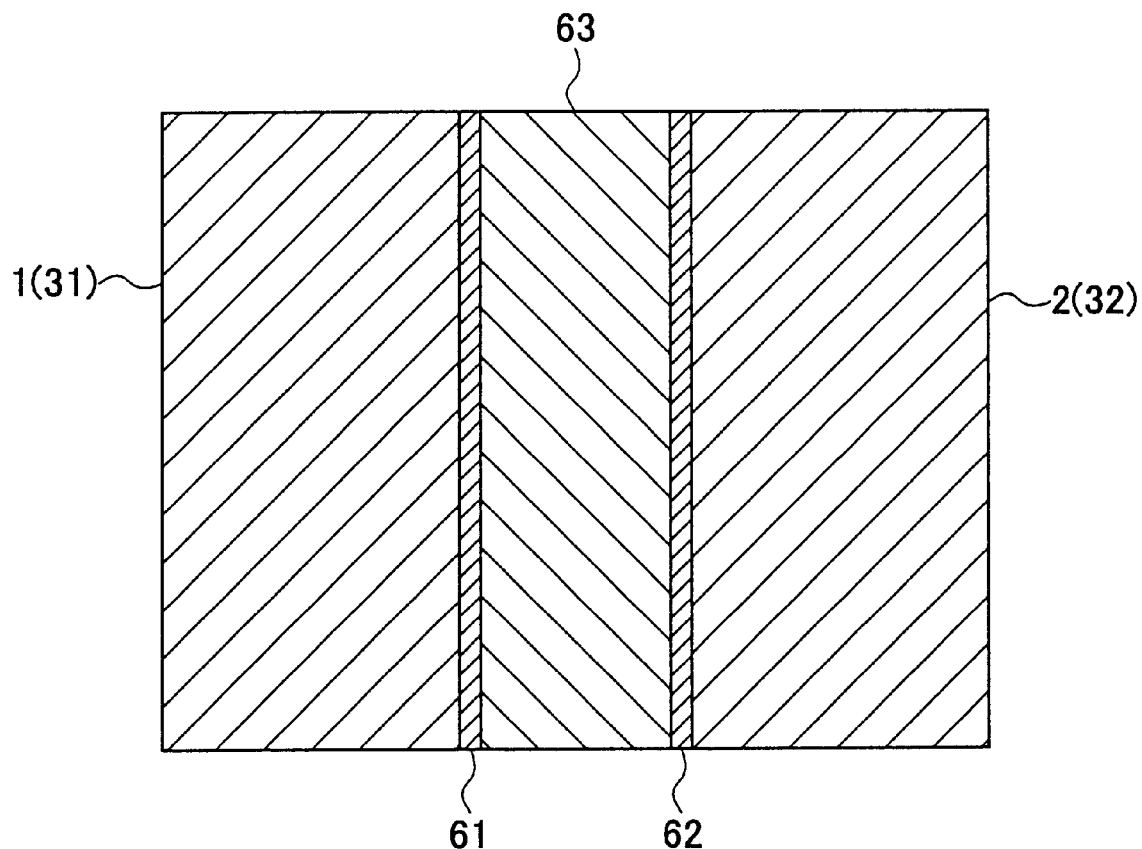
FIG. 5 shows a partial sectional view illustrating a reflection preventing measure in each of the first and second embodiments of the present invention.

For example, a refractive index of an acrylic ultraviolet cure adhesive layer 63 (see FIG. 5) generally used for joining lenses is on the order of 1.52. In the zoom lens in the above-mentioned first embodiment of the present invention, the 1-1 lens 1 has a refractive index of 1.84666, and the 1-2 lens 2 has a refractive index of 1.60311. Accordingly, the reflectance at the surface (02) at which the lenses 1 and 2 are joined is estimated as follows:

TABLE 1

|  | Transmittance | Reflectance |
| --- | --- | --- |
| second surface of 1-1 lens 1 | 0.99059 | 0.00941 |
| first surface of 1-2 lens 2 | 0.99929 | 0.00071 |
| entire surface of junction | 0.98988 | 0.01012 |

As shown in Table 1, the reflectance at the surface 02 at which the 1-1 lens 1 and 1-2 lens 2 are joined in the zoom lens in the first embodiment is on the order of 1%. This value of the reflectance corresponds to one obtained when single-layer coating is made on a lens surface in contact with air, or higher than one obtained in such a case but depending on a refractive index of a glass material and/or a wavelength. Accordingly, it will be effective to provide the above-mentioned reflection preventing measure to the surface 02 at which the lenses 1 and 2 are joined, for the purpose of reducing the ghost flare.

The reflection preventing measure provided to the surface (02) at which the lenses 1 and 2 are joined includes a coating film formed on the surface 02 at which the lenses 1 and 2 are joined. In the above-mentioned first embodiment, the refractive index of the glass material used for the 1-2 lens 2 is relatively low. Accordingly, reflection made by the second surface of the 1-1 lens 1 is almost all of reflection made by the entire surface 02 at which lenses 1 and 2 are joined. As a result, it is effective to form the coating film 61 (see FIG. 5) only on the second surface of the 1-1 lens 1, for the purpose of reducing the ghost flare.

As this coating film, a single-layer film made of a vapor deposition material having a refractive index intermediate between the glass material of the 1-1 lens 1 and the adhesive of the junction, for example, $Al_2O_3$ (having a refractive index on the order of 1.60) can be considered. In this case, for a wavelength satisfying a phase requirement ($n \cdot d = \frac{1}{4}\lambda$, where n denotes a refractive index of the vapor deposition material, and d denotes the film thickness), the reflectance is reduced to the order of 0.2%, and, thereby, the ghost light is not likely to be remarkable.

Figure 6:
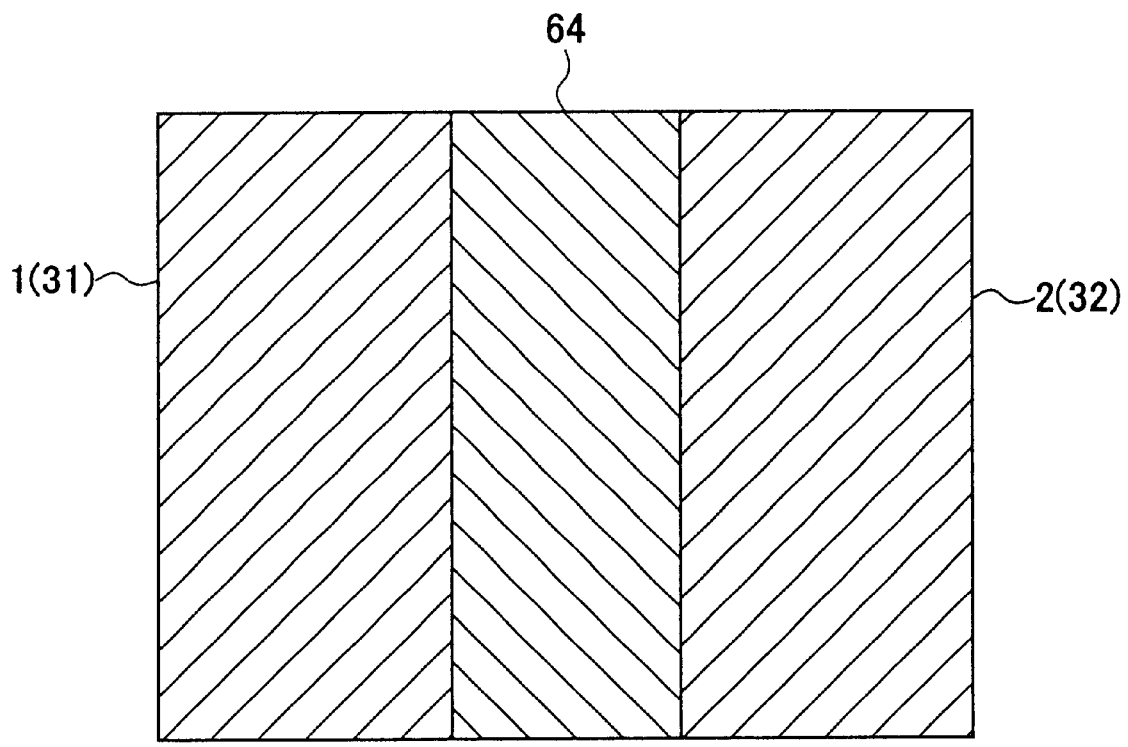
FIG. 6 shows a partial sectional view illustrating another example of the reflection preventing measure in each of the first and second embodiments of the present invention.

Alternatively, the reflection preventing measure provided to the surface 02 at which the two lenses 1 and 2 are joined may be made of the adhesive layer of the junction having a high refractive index. Assuming that the refractive index of the adhesive 64 (see FIG. 6) used for the junction between the lenses 1 and 2 is 1.62 in the above-mentioned first embodiment, the reflectance at the surface 02 of the junction between the lenses 1 and 2 is estimated as shown in Table 2 below:

TABLE 2

|  | Transmittance | Reflectance |
| --- | --- | --- |
| second surface of 1-1 lens 1 | 0.99573 | 0.00427 |
| first surface of 1-2 lens 2 | 0.99997 | 0.00003 |
| entire surface of junction | 0.99570 | 0.00430 |

As shown in Table 2, the reflectance at the surface 02 of junction between the 1-1 lens 1 and 1-2 lens 2 is reduced to the order of 0.4% which is less than half of the case where a general acrylic ultraviolet cure adhesive (having a refractive index of 1.52) is used. Accordingly, the ghost light is not likely to be remarkable. Thus, in order to obtain a sufficient reflection preventing effect, it is preferable to satisfy a conditional formula of $$n_a > 1.60$$

where $n_a$ denotes a refractive index of the adhesive used for the junction.

As the adhesive having a refractive index equal to or larger than 1.60, various ones can be considered such as one having a main component of epoxy resin, acrylic one containing sulfur, and so forth. Any thereof may be selected appropriately in consideration of costs, cure requirements, and so forth.

When the adhesive having a high refractive index is used, it can be possible to prevent the number of steps of the process from increasing, differently from the case where the extra coating film is used as mentioned above. Further, it is possible to obtain the effect for both the second surface of the 1-1 lens 1 and the first surface of the 1-2 lens 2 at the same time by the method of employing the high-refractive-index adhesive.

Further, when the adhesive having a high refractive index is used, it is preferable to satisfy the following conditional formula:

$$(|n_{1\text{-}1} - n_a| + |n_{1\text{-}2} - n_a|)/2 < 0.21$$

where $n_{1\text{-}1}$ denotes the refractive index of the 1-1 lens 1, and $n_{1\text{-}2}$ denotes the refractive index of the 1-2 lens 2. By selecting a glass material of each lens and the adhesive such as those satisfying this conditional formula, it is possible to further reduce the reflectance, and, as a result, the ghost light is further not likely to be remarkable.

Figure 3:
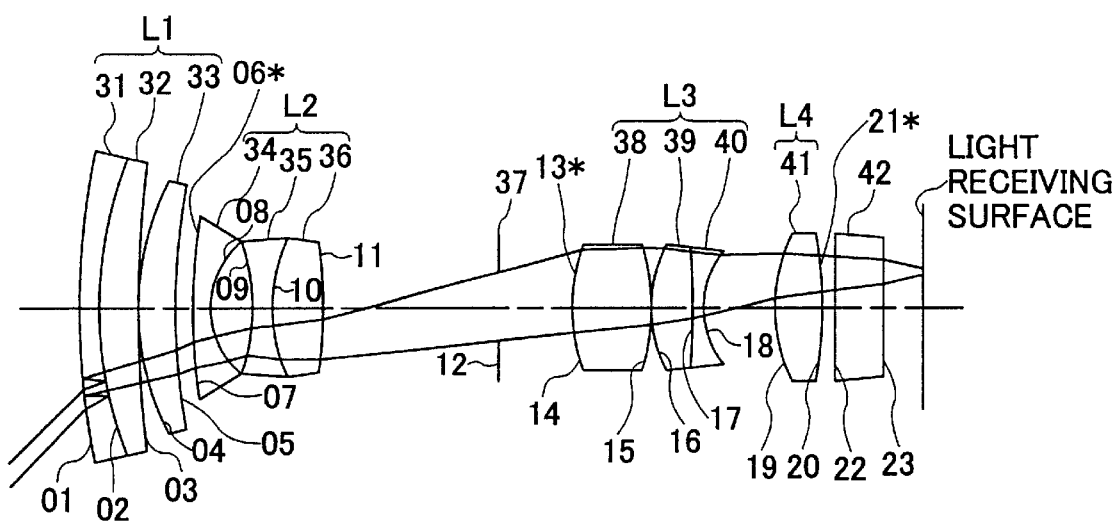
FIG. 3 shows a configuration of a second embodiment of the present invention.

FIG. 3 shows a zoom lens in a second embodiment of the present invention.

This zoom lens includes a first lens group L1 having a positive focal length, a second lens group L2 having a negative focal length, an aperture stop member 37, a third lens group L3 having a positive focal length, a fourth lens group L4 and a filter 42, disposed in the stated order from an object.

The first lens group L1 includes a negative meniscus 1-1 lens 31 having a convex surface directed toward the object, a positive meniscus 1-2 lens 32 having a convex surface having a larger curvature directed toward the object and joined with the 1-1 lens 31, and a positive meniscus 1-3 lens 33 having a convex surface directed toward the object, disposed in the stated order from the object.

The second lens group L2 includes a negative meniscus 2-1 lens 34 having a surface having a large curvature directed toward an image, a double-concave 2-2 lens 35 and a double-convex 2-3 lens 36, disposed in the stated order from the object.

The third lens group L3 includes a double-convex 3-1 lens 38, a positive meniscus 3-2 lens 39 having a surface having a large curvature directed toward the object, and a negative meniscus 3-3 lens 40 having a surface having a larger curvature directed toward the image, disposed in the stated order from the object.

The fourth lens group L4 includes a double-convex 4-1 lens 41.

The surface 02 at which the 1-1 lens 31 and 1-2 lens 32 are joined is provided with a reflection preventing measure which will be described later.

Figure 4:
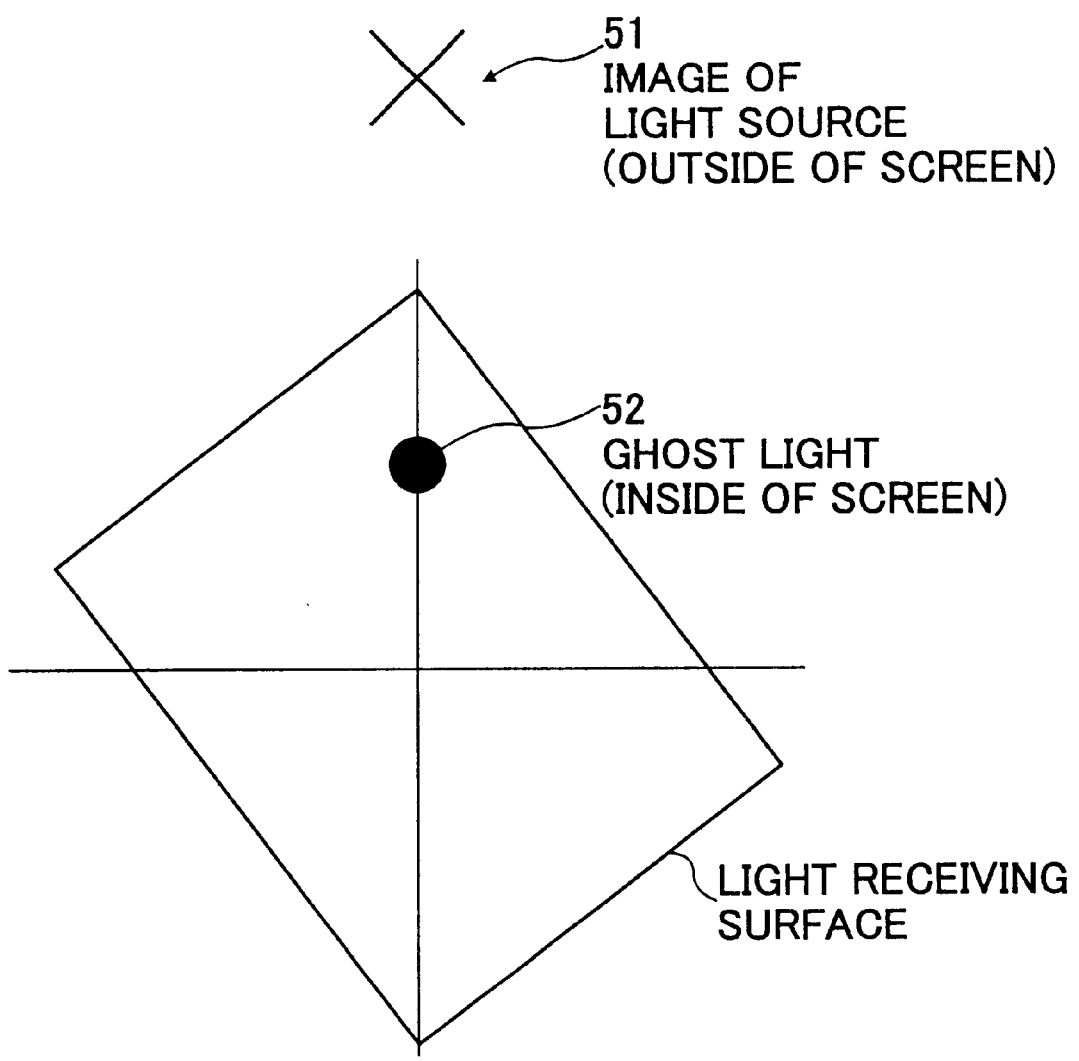
FIG. 4 shows a spot diagram of an image formed on an image surface in a system shown in FIG. 3.

As shown in FIG. 3, in a state of a short-focal-length end of this zoom lens, a beam coming from a light source (approximately infinite, such as the sun) with an angle of 45° with respect to the optical axis is reflected between two lens surfaces (01 and 02) and reaches an image surface (light receiving surface), and thus, the ghost light is generated. Same as in the above-mentioned first embodiment, the ghost light is reflected by the surface 02 at which the 1-1 lens 31 and 1-2 lens 32 are joined, together, and, then, is reflected by the first surface 01 of the 1-1 lens 31 again. FIG. 4 shows a spot diagram of the ghost light on the image surface (light receiving surface). The rectangle frame shown in FIG. 4 shows an image-pickup screen (light receiving surface) in a case where the light source is in a diagonal direction, for example.

A half field angle of the zoom lens in the second embodiment in the state of the short-focal-length end thereof is 33.2°, and an image 51 of the light source having the angle 45° with respect to the optical axis exists outside of the screen. However, same as in the above-mentioned first embodiment, the ghost light 52 enters the screen, and is focused there. Accordingly, it is bright and remarkable. In this zoom lens having the configuration as described above, it is difficult to exclude this type of ghost light from the screen even when configuration parameters of the lenses are altered in various manners.

In the zoom lens in the above-mentioned second embodiment of the present invention, the 1-1 lens 31 has a refractive index of 1.84666, and the 1-2 lens 32 has a refractive index of 1.77250. Accordingly, the reflectance at the surface 02 at which the lenses 31 and 32 are joined in a case where a general acrylic ultraviolet cure adhesive layer 63 (having a refractive index of 1.52) is used for this junction is estimated as follows:

TABLE 3

|  | Transmittance | Reflectance |
| --- | --- | --- |
| second surface of 1-1 lens 31 | 0.99059 | 0.00941 |
| first surface of 1-2 lens 32 | 0.99412 | 0.00588 |
| entire surface of junction | 0.98476 | 0.01524 |

As shown in Table 3, the reflectance at the surface 02 at which the 1-1 lens 31 and 1-2 lens 32 are joined in the zoom lens in the second embodiment is on the order of 1.5%. This value of the reflectance is larger than one obtained when single-layer coating is made on a lens surface in contact with air. Accordingly, same as in (or in comparison to) the above-mentioned first embodiment, it will be effective to provide the above-mentioned reflection preventing measure to the surface 02 at which the lenses 31 and 32 are joined, for the purpose of reducing the ghost flare.

The reflection preventing measure provided to the surface 02 at which the lenses 31 and 32 are joined includes a coating film formed on the surface 02 at which the lenses 31 and 32 are joined. In the above-mentioned second embodiment, the refractive index of the glass material used for the 1-2 lens 32 is relatively high. Accordingly, reflective light made by the first surface of the 1-2 lens 32 cannot be ignored. Accordingly, it is possible to obtain a sufficient effect by forming coating films 61 and 62 on the second surface of the 1-1 lens 31 and the first surface of the 1-2 lens 32, respectively, for the purpose of reducing the ghost flare (see FIG. 5).

The coating film used in the case of the zoom lens in the above-mentioned first embodiment can also be used as the coating film to be formed on the second surface of the 1-1 lens 31. A single-layer film made of $Al_2O_3$ (having a refractive index on the order of 1.60) can also be used as the coating film to be formed on the first surface of the 1-2 lens 32. In this case, for a wavelength satisfying the phase requirement, the reflectance of the entire surface of junction is reduced to the order of 0.3%, and, thereby, the ghost light is not likely to be remarkable.

In an alternative case where the above-mentioned adhesive 64 (see FIG. 6) having a high refractive index is used as the reflection preventing measure in the second embodiment, assuming that the refractive index of the adhesive 64 used for the junction between the lenses 31 and 32 is 1.62, the reflectance at the surface 02 of the junction between the lenses 31 and 32 is estimated as shown in Table 4 below:

TABLE 4

|  | Transmittance | Reflectance |
| --- | --- | --- |
| second surface of 1-1 lens 31 | 0.99573 | 0.00427 |
| first surface of 1-2 lens 32 | 0.99798 | 0.00202 |
| entire surface of junction | 0.99371 | 0.00629 |

As shown in Table 4, the reflectance at the entire surface 02 of junction between the 1-1 lens 31 and 1-2 lens 32 in the second embodiment is reduced to the order of 0.6% which is less than half of the case where a general acrylic ultraviolet cure adhesive (having a refractive index of 1.52) is used. Accordingly, the ghost light is not likely to be remarkable.

Further, in each of the first and second embodiments, it is possible to cause the ghost light to be further not likely to be remarkable, by forming a multi-coating film on the first surface 01 of the 1-1 lens 1 or 31. The multi-coating film formed on the 1-1 lens 1 or 31 also improves a texture of the lens. Therefore, in the second embodiment, it is also possible to form the multi-coating lens on the first surface 01 of the 1-1 lens 31 and omit forming of the coating film on the first surface of the 1-2 lens 32 (one of the lens surfaces to be joined there having the lower refractive index of glass material).

Data of the lenses of the zoom lenses in the above-mentioned first and second embodiments of the present invention are as follows:

In each embodiment, each symbol denotes the following meaning:

f: focal length (mm) of the entire system;
F/No.: F number;
ω: half field angle (degrees);
R: radius of curvature (mm);
D: surface separation (mm);

D: refractive index;
vd: Abbe's number;
K: conic constant of aspherical surface;
$A_4$: aspherical coefficient of 4-th order;
$A_6$: aspherical coefficient of 6-th order;
$A_8$: aspherical coefficient of 8-th order; and
$A_{10}$: aspherical coefficient of 10-th order.

The above-mentioned aspherical surface is defined by the following formula (3):

$$X = \frac{CH^2}{1 + \sqrt{(1 \cdot (1+K)C^2H^2)}} + A_4H^4 + A_6H^6 + A_8H^8 + A_{10}H^{10} \quad (3)$$

where C denotes the reciprocal of the radius of paraxial curvature and H denotes the height from the optical axis.

First Embodiment f=7.51 through 20.91; F/No.=2.62 through 3.40; ω=32.8 through 12.6

| Surface Number | R | D | Nd | vd | Note |
|---|---|---|---|---|---|
| 01 | 29.916 | 1.400 | 1.84666 | 23.78 | 1-1 lens 1 |
| 02 | 20.987 | 3.480 | 1.60311 | 60.69 | 1-2 lens 2 |
| 03 | 63.867 | 0.100 | | | |
| 04 | 18.034 | 2.730 | 1.60311 | 60.69 | 1-3 lens 3 |
| 05 | 42.342 | variable (A) | | | |
| 06* | 1000.000 | 0.040 | 1.50703 | 53.43 | |
| 07 | 90.347 | 0.960 | 1.83500 | 42.98 | 2-1 lens 4 |
| 08 | 6.327 | 2.960 | | | |
| 09 | −20.914 | 1.040 | 1.62299 | 58.12 | 2-2 lens 5 |
| 10 | 7.694 | 5.570 | 1.83400 | 37.34 | 2-3 lens 6 |
| 11 | −36.134 | variable (B) | | | |
| 12 | stop | variable (C) | | | |
| 13* | 12.996 | 0.040 | 1.50703 | 53.43 | |
| 14 | 14.036 | 3.450 | 1.58913 | 61.25 | 3-1 lens 8 |
| 15 | −21.510 | 0.100 | | | |
| 16 | 11.861 | 3.270 | 1.77250 | 49.62 | 3-2 lens 9 |
| 17 | −31.300 | 0.810 | 1.76182 | 26.61 | 3-3 lens 10 |
| 18 | 7.074 | variable (D) | | | |
| 19 | 13.968 | 3.230 | 1.51680 | 64.20 | 4-1 lens 11 |
| 20 | −39.144 | 0.040 | 1.50703 | 53.43 | |
| 21* | −32.145 | any value | | | |
| 22 | ∞ | 3.332 | 1.51680 | 64.20 | filter 12 |
| 23 | ∞ | | | | |

The aspherical surface (formed by a resin layer on the surface 07) of the surface number of 06:

$K=0.0$;

$A_4=1.52740 \times 10^{-4}$;

$A_6=-1.32245 \times 10^{-6}$;

$A_8=1.09498 \times 10^{-8}$;

$A_{10}=-4.24043 \times 10^{-11}$.

The aspherical surface (formed by a resin layer on the surface 14) of the surface number of 13:

$K=-6.26756$;

$A_4=1.83557 \times 10^{-4}$;

$A_6=-1.91030 \times 10^{31\ 6}$;

$A_8=-5.84921 \times 10^{-8}$;

$A_{10}=1.97434 \times 10^{-9}$.

The aspherical surface (formed by a resin layer on the surface 20) of the surface number of 21:

$K=3.66661$;

$A_4=1.65329 \times 10^{-4}$;

$A_6=-2.65988 \times 10^{-6}$;

$A_8=8.32392 \times 10^{-8}$;

$A_{10}=-1.47477 \times 10^{-9}$.

Variable Separation

| | Short-focal-length End f = 7.51 | Medium-focal-length f = 12.50 | Long-focal-length End f = 21.33 |
|---|---|---|---|
| A | 1.400 | 6.440 | 11.480 |
| B | 11.190 | 6.150 | 1.110 |
| C | 5.805 | 3.348 | 1.644 |
| D | 4.935 | 7.392 | 9.096 |

Value of the conditional formula:

$n_a=1.62$ $(|n_{1-1}-n_a|+|n_{1-2}-n_a|)/2=0.122$

Second Embodiment f=7.51 through 21.23; F/No.=2.68 through 3.50; ω=33.2 through 12.2

| Surface Number | R | D | Nd | vd | Note |
|---|---|---|---|---|---|
| 01 | 65.170 | 1.400 | 1.84666 | 23.78 | 1-1 lens 31 |
| 02 | 29.478 | 2.740 | 1.77250 | 49.62 | 1-2 lens 32 |
| 03 | 127.500 | 0.100 | | | |
| 04 | 22.349 | 2.440 | 1.77250 | 49.62 | 1-3 lens 33 |
| 05 | 56.773 | variable (A) | | | |
| 06* | 1000.000 | 0.040 | 1.50703 | 53.43 | |
| 07 | 151.049 | 0.960 | 1.80610 | 40.73 | 2-1 lens 34 |
| 08 | 6.787 | 2.910 | | | |
| 09 | −15.102 | 1.320 | 1.60311 | 60.69 | 2-2 lens 35 |
| 10 | 9.190 | 3.780 | 1.83400 | 37.34 | 2-3 lens 36 |
| 11 | −26.300 | variable (B) | | | |
| 12 | stop | variable (C) | | | |
| 13* | 13.381 | 0.040 | 1.50703 | 53.43 | |
| 14 | 14.483 | 4.960 | 1.58913 | 61.25 | 3-1 lens 38 |
| 15 | −20.252 | 0.100 | | | |
| 16 | 11.816 | 3.240 | 1.77250 | 49.62 | 3-2 lens 39 |
| 17 | −53.710 | 0.800 | 1.80518 | 25.46 | 3-3 lens 40 |
| 18 | 7.300 | variable (D) | | | |
| 19 | 14.000 | 3.180 | 1.58913 | 61.25 | 4-1 lens 41 |
| 20 | −66.205 | 0.040 | 1.50703 | 53.43 | |
| 21* | −49.895 | any value | | | |
| 22 | ∞ | 3.332 | 1.51680 | 64.20 | filter 42 |
| 23 | ∞ | | | | |

The aspherical surface (formed by a resin layer on the surface 07) of the surface number of 06:

$K=0.0$;

$A_4=1.07973\times10^{-4}$;

$A_6=-1.95022\times10^{-6}$;

$A_8=3.30936\times10^{-8}$;

$A_{10}=-2.82138\times10^{-10}$.

The aspherical surface (formed by a resin layer on the surface 14) of the surface number of 13:

$K=-5.84434$;

$A_4=1.31144\times10^{-4}$;

$A_6=6.14724\times10^{-7}$;

$A_8=-1.68267\times10^{-7}$;

$A_{10}=4.04411\times10^{-9}$.

The aspherical surface (formed by a resin layer on the surface 20) of the surface number of 21:

$K=11.53148$;

$A_4=1.63303\times10^{-4}$;

$A_6=-3.95256\times10^{-6}$;

$A_8=1.19208\times10^{-7}$;

$A_{10}=-1.84451\times10^{-9}$.

Variable Separation

|   | Short-focal-length End f = 7.51 | Medium-focal-length f = 12.55 | Long-focal-length End f = 21.23 |
|---|---|---|---|
| A | 1.400 | 7.000 | 12.600 |
| B | 12.300 | 6.700 | 1.100 |
| C | 5.819 | 3.245 | 1.420 |
| D | 5.011 | 7.585 | 9.410 |

Value of the conditional formula:

$n_a=1.62$.

$(|n_{1-1}-n_a|+|n_{1-2}-n_a|)/2=0.190$.

Figure 7A:
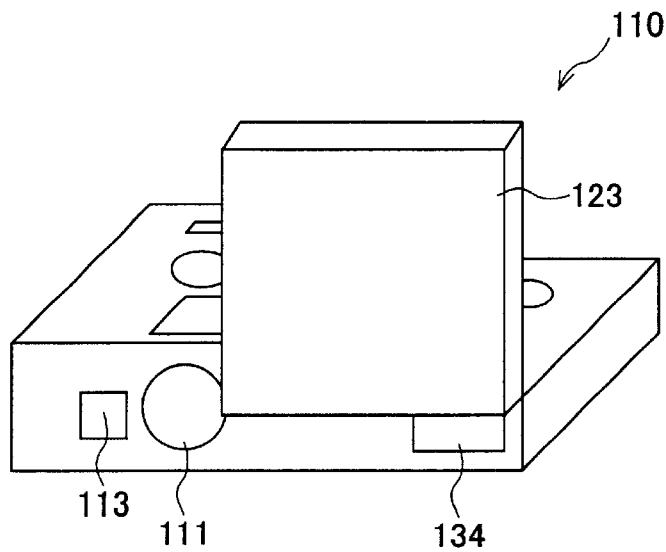
FIGS. 7A, 7B and 7C illustrate a front perspective view, a rear perspective view and a general block diagram of a camera/portable information terminal device in one embodiment of the present invention employing a zoom lens according to the present invention.

With reference FIGS. 7A, 7B and 7C, one embodiment of a camera/portable information terminal device employing a zoom lens according to the present invention will now be described.

This camera/portable information terminal device 110 includes a taking lens 111 corresponding to the above-mentioned zoom lens in the above-mentioned first or second embodiment of the present invention (in FIG. 7A, only the 1-1 lens 1 or 31 shown in FIGS. 1 or 3 of the zoom lens can be actually viewed), and, an image to be picked up is read through a light receiving device (area sensor) 115. The light receiving surface of this light receiving device 115 corresponds to the above-mentioned light receiving surface shown in FIGS. 1 or 3.

The output of the light receiving device 115 is input to a signal processing device 117 controlled by a CPU 121, so that digital information is obtained therefrom.

The image information (digital information) generated by the signal processing device 117 undergoes predetermined image processing by an image processing device 119 also controlled by the CPU 121. The thus-processed image information may be displayed on a liquid crystal monitor 123, or may be stored in a semiconductor memory 127. Alternatively, it may be transferred externally by a commination card 125 or the like via the Internet, for example.

Figure 7B:
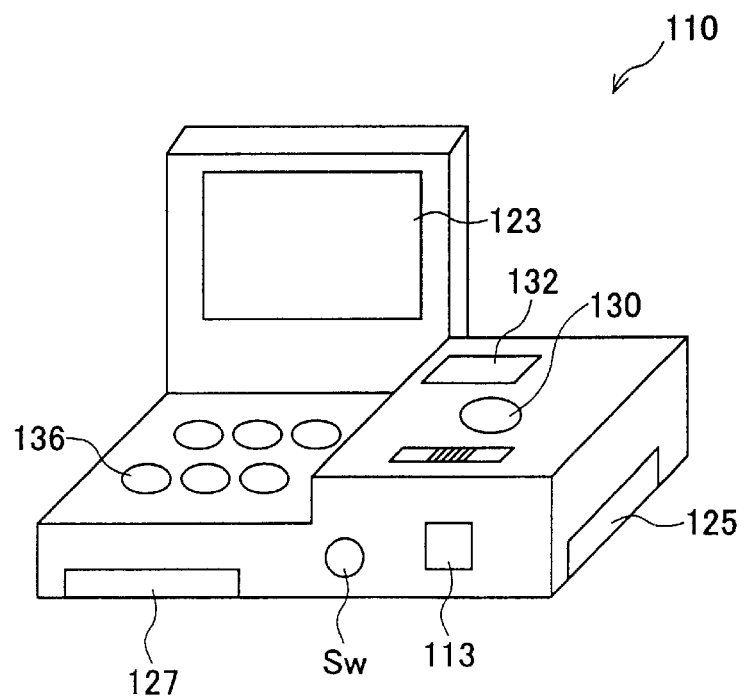
Figure 7C:
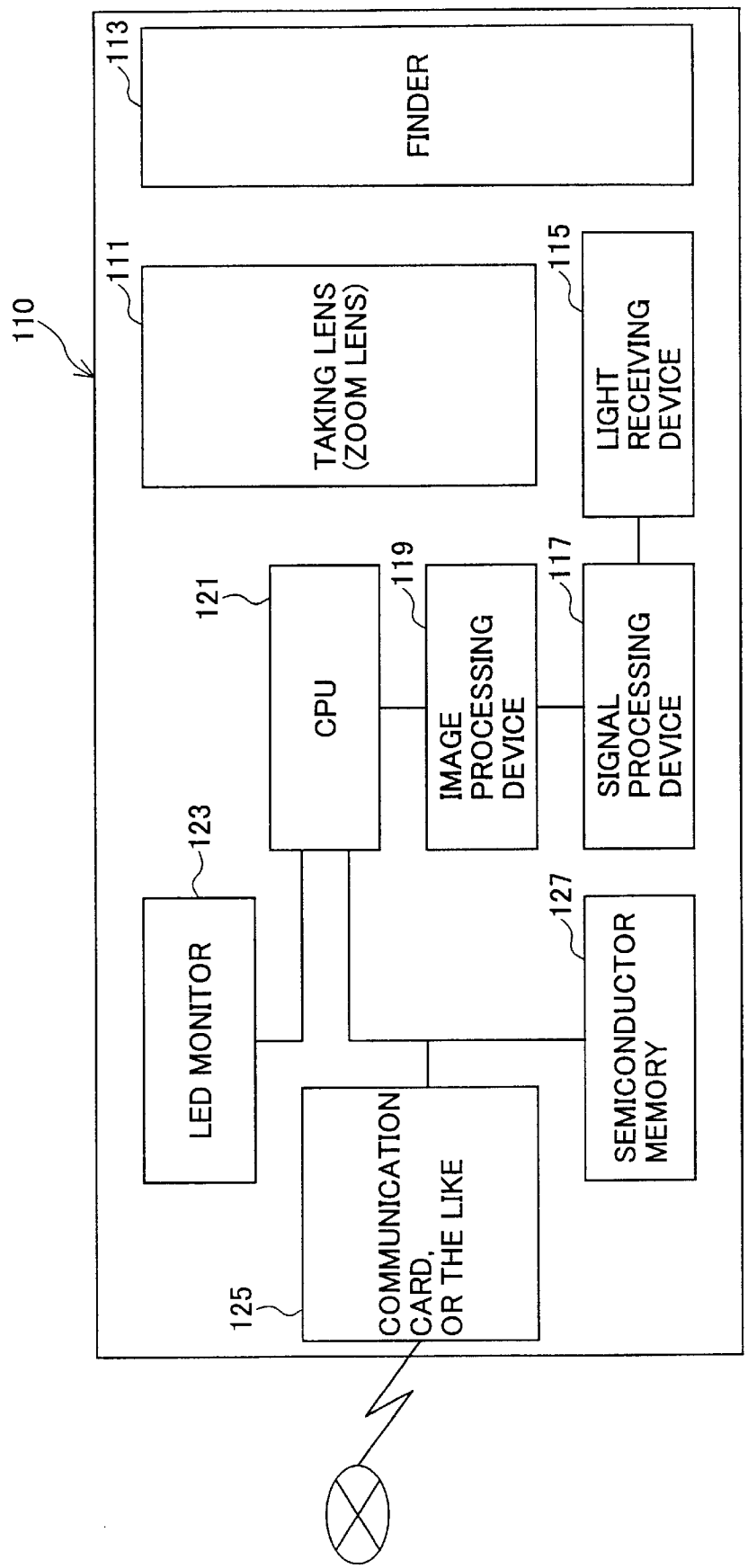

When image picking up is to be performed using this camera/portable information terminal device 110, a switch Sw, shown in FIG. 7B, is pressed. Then, an operation mode is selected as a result of operation buttons 136 being pressed appropriately. Then, a user views a finder 113, shown in FIG. 7B, and, selects a zoom ratio by operating a zoom lever 138. At this time, focusing is performed automatically.

When a shutter button 130 is pressed, image picking up is rendered. Then, thus-obtained image information undergoes digital processing as described above in the camera/portable information terminal device 110. When operation buttons 136 are operated appropriately, the thus-picked-up image can be viewed through the liquid crystal monitor 123.

The thus-obtained digital image information may be stored in the semiconductor memory 127 (memory card), when it is inserted into a special slot provided in a body of the camera 110, and the operation buttons 136 are operated appropriately by the user.

Further, in order to transmit this digital information externally, the operation buttons 136 are appropriately operated when the communication card 125 is inserted into a special slot provided in the body of the camera 110. Furthermore, it is also possible to receive image information externally via the communication card 125, and to see it on the liquid crystal monitor 123.

Further, the present invention is not limited to the above-described embodiments, and variations and modifications may be made without departing from the scope of the present invention.

The present application is based on Japanese priority application No. 2000-145515, filed on May 17, 2000, the entire contents of which are hereby incorporated by reference.

What is claimed is:

1. A zoom lens comprising a first lens group having a positive focal length, a second lens group having a negative focal length, an aperture stop member, a third lens group having a positive focal length, disposed in the stated order from the side of an object, wherein:

said first lens group comprises a negative meniscus 1-1 lens having a convex surface directed toward the object, a positive meniscus 1-2 lens having a convex surface having a large curvature directed toward the object and joined with said 1-1 lens, and a positive meniscus 1-3 lens having a convex surface directed toward the object, disposed in the stated order from the side of the object; and a reflection preventing part is formed on a surface at which said 1-1 lens and said 1-2 lens are joined.

2. The zoom lens as claimed in claim 1, wherein said reflection preventing part comprises a coating film formed only on one of a second surface of said 1-1 lens and a first surface of said 1-2 lens having a higher refractive index of lens material.

3. The zoom lens as claimed in claim 1, wherein said reflection preventing part comprises coating films formed both on a second surface of said 1-1 lens and on a first surface of said 1-2 lens, respectively.

4. The zoom lens as claimed in claim 1, wherein said reflection preventing part comprises an adhesive layer having a high refractive index $n_a$ used for joining said 1-1 lens and said 1-2 lens, wherein:

$n_a > 1.60$.

5. The zoom lens as claimed in claim 4, wherein the following formula is satisfied:

$$(|n_{1-1} - n_a| + |n_{1-2} - n_a|)/2 < 0.21.$$

where $n_{1-1}$ denotes a refractive index of said 1-1 lens and $n_{1-2}$ denotes a refractive index of said 1-2 lens.

6. The zoom lens as claimed in claim 1, wherein a multi-coating film is formed on a first surface of said 1-1 lens.

7. A camera employing the zoom lens claimed in claim 1 as a pickup lens thereof.

8. The camera as claimed in claim 7, having a function of generating digital information from an image picked up by using said zoom lens.

9. The camera as claimed in claim 8, further comprising a light receiving device for receiving light of an image obtained through the zoom lens and having the number of pixels equal to or larger than 3 millions.

10. A portable information terminal device comprising the camera as claimed in claim 8.

11. A zoom lens comprising first lens means having a positive focal length, second lens means having a negative focal length, aperture stop means, third lens means having a positive focal length, disposed in the stated order from the side of an object, wherein:

said first lens means comprises a negative meniscus 1-1 lens having a convex surface directed toward the object, a positive meniscus 1-2 lens having a convex surface having a large curvature directed toward the object and joined with said 1-1 lens, and a positive meniscus 1-3 lens having a convex surface directed toward the object, disposed in the stated order from the side of the object; and reflection preventing means is provided on a surface at which said 1-1 lens and said 1-2 lens are joined.

* * * * *